United States Patent [19]

Gibler et al.

[11] 4,393,997

[45] Jul. 19, 1983

[54] REMOVABLE SECONDARY AIRCRAFT FUEL ENCLOSURE

[75] Inventors: David L. Gibler, Rancho Palos Verdes; Daniel J. O'Connell, Cypress, both of Calif.

[73] Assignee: The United States of America as represented by the Secretary of the Air Force, Washington, D.C.

[21] Appl. No.: 368,785

[22] Filed: Apr. 15, 1982

[51] Int. Cl.³ .............................................. B64D 37/32
[52] U.S. Cl. ................................. 244/135 R; 244/120; 222/108; 137/312
[58] Field of Search ........................ 244/135 R, 135 B; 220/85 VR, 85 VS; 137/312, 313, 314; 222/108, 109; 180/69.1; 296/38

[56] References Cited

U.S. PATENT DOCUMENTS

| | | | |
|---|---|---|---|
| 976,472 | 11/1910 | Lederer | 180/69.1 |
| 1,148,426 | 7/1915 | Bachman | 296/38 |
| 1,793,777 | 2/1931 | Condon | |
| 2,404,418 | 7/1946 | Walker | 220/88 |
| 2,464,827 | 3/1949 | Noyes | 220/63 |
| 2,472,622 | 6/1949 | Savard | 244/135 R |
| 2,889,955 | 6/1959 | Naulty et al. | 220/88 |
| 3,119,887 | 1/1964 | Baehr | 137/312 |
| 3,243,150 | 3/1966 | Woodcock | 244/135 |
| 3,321,159 | 5/1967 | Jackson | 244/135 |
| 3,968,896 | 7/1976 | Giacoletti et al. | 220/63 R |

FOREIGN PATENT DOCUMENTS 394481  12/1908  France .............................. 180/69.1

Primary Examiner—Charles E. Frankfort
Assistant Examiner—Rodney Corl
Attorney, Agent, or Firm—Donald J. Singer; Bobby D. Scearce

[57] ABSTRACT

A removable secondary aircraft fuel tank enclosure is provided which comprises a pair of substantially flat panels supported within the aircraft fuselage beneath the center wing tank and joined to each other to form a drip pan having a shallow trough for collecting liquid seepage from the tank. A drain line communicates with the trough for discharging liquid collections overboard. An upright removal panel attached to the aircraft structure sealably joins the drip pan fore and aft and means adjacent the enclosure seal the sides of the drip pan against the aircraft structure. Sponge rubber provides a peripheral seal on the flat panels and a plurality of peripheral overcenter fasteners support the drip panel and seals it to the end panels and aircraft structure.

3 Claims, 6 Drawing Figures

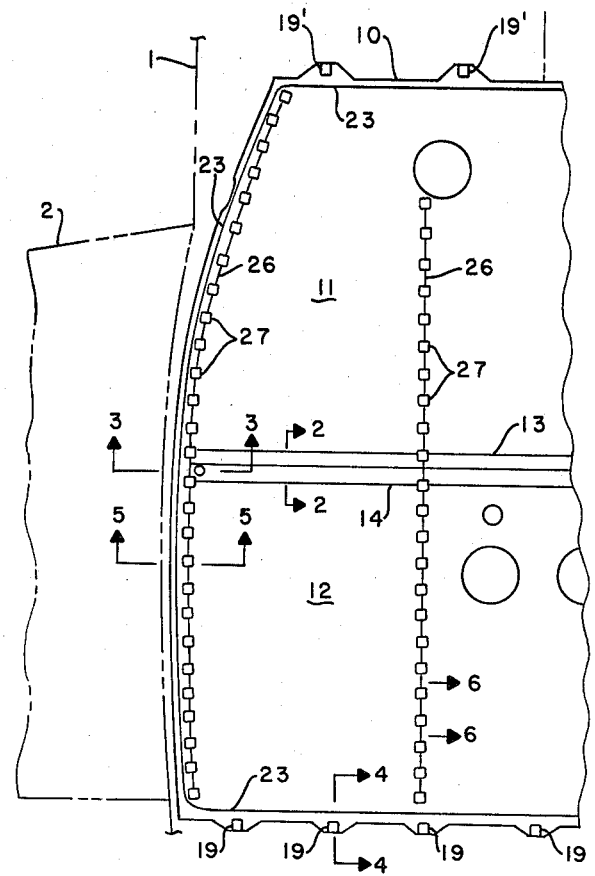
Fig. 1
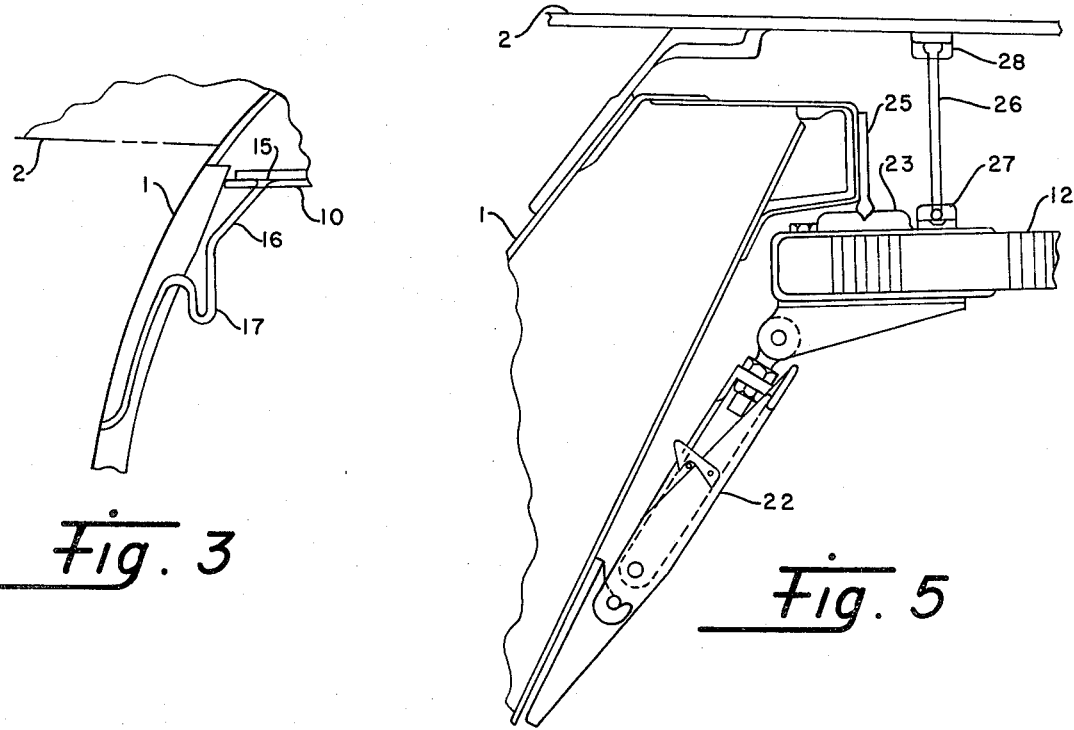
Fig. 3
Fig. 5 ns, and the space between the two containers, must be continuously drained and ventilated during flight. Certain high wing aircraft, such as the C-17A, may have the center wing section within the fuselage configured to include an auxiliary fuel tank. In such instances, special safety precautions are taken in the structure of the aircraft to ensure that the center wing tank is designed to protect the aircraft occupants and cargo from contact with liquid fuel or fuel vapors. In this type of aircraft, it is desirable to enclose the entire wing box structure containing the center wing tank with a secondary enclosure separate from the tank structure itself.

REMOVABLE SECONDARY AIRCRAFT FUEL ENCLOSURE

RIGHTS OF THE GOVERNMENT

The invention described herein may be manufactured and used by or for the Government of the United States for all governmental purposes without the payment of any royalty.

BACKGROUND OF THE INVENTION

This invention relates generally to aircraft fuel tank structures, and more particularly to a secondary enclosure for an aircraft fuel tank configured to seal the tank against fuel vapor leakage into occupied aircraft compartments.

In the observance of appropriate safety precautions and design criteria for aircraft fuel tanks, fuel carried within an occupied compartment of the aircraft must be enclosed in two separate (inner and outer) fuel vapor-tight containers, and the space between the two containers must be continuously drained and ventilated during flight. Certain high wing aircraft, such as the C-17A, may have the center wing section within the fuselage configured to include an auxiliary fuel tank. In such instances, special safety precautions are taken in the structure of the aircraft to ensure that the center wing tank is designed to protect the aircraft occupants and cargo from contact with liquid fuel or fuel vapors. In this type of aircraft, it is desirable to enclose the entire wing box structure containing the center wing tank with a secondary enclosure separate from the tank structure itself.

Existing aircraft tank structures having means to prevent leakage of liquid or vapor fuel into occupied compartments comprise fuel-tight bladder cells within the wing tank structure. These structures not only are costly and add extra weight to the aircraft, but have been found to produce pockets of unuseable fuel, to reduce available fuel volume, and to limit inspection and maintenance.

The present invention provides a novel secondary fuel tank enclosure for an integral center wing tank structure wherein the tank is surrounded by a plurality of removable panels of fiberglass honeycomb forming a vapor-tight, removable enclosure. The novel structure of the present invention provides a reliable vapor-tight seal around the fuel tank adjacent fuselage compartments. In addition, it provides desirable thermal and acoustic insulation, is lightweight, corrosion resistant, and inexpensive, and allows use of the entire wing for tankage. Furthermore, the design facilitates inspection and maintenance of the enclosed fuel tank and aircraft structure. Means may be provided additionally to vent aircraft cabin air overboard through the enclosure to remove any fuel leakage from the enclosure.

It is therefore, an object of the present invention to provide a secondary enclosure for aircraft fuel tanks to prevent fuel leakage into occupied aircraft compartments.

It is a further object of the present invention to provide a removable secondary enclosure for aircraft fuel tanks.

These and other objects of the present invention will become apparent as the detailed description of a representative embodiment thereof proceeds.

SUMMARY OF THE INVENTION

In accordance with the foregoing principles and objects of the present invention, a removable secondary aircraft fuel tank enclosure is provided which comprises a pair of substantially flat panels supported within the aircraft fuselage beneath the center wing tank and joined to each other to form a drip pan having a shallow trough for collecting liquid seepage from the tank. A drain line communicates with the trough for discharging liquid collections overboard. An upright removable panel attached to the aircraft structure sealably joins the drip pan fore and aft and means adjacent the enclosure seal the sides of the drip pan against the aircraft structure. Sponge rubber provides a peripheral seal on the flat panels and a plurality of peripheral overcenter fasteners support the drip panel and seals it to the end panels and aircraft structure.

DESCRIPTION OF THE DRAWINGS

The present invention will be more clearly understood from the following detailed description of a representative embodiment thereof read in conjunction with the accompanying drawings wherein:

FIG. 1 is a partial plan view of the drip pan of the present invention showing placement thereof within the fuselage of an aircraft beneath the center wing section.

FIG. 3 is a partial view of FIG. 1 taken along lines 3—3 showing schematically the overboard drain line.

FIG. 5 is a view of the lower drip panel of FIG. 1 taken along lines 5—5 showing the lateral support configurations for the drip panel.

DETAILED DESCRIPTION

Figure 2:
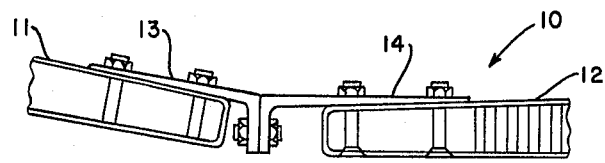
FIG. 2 is a partial sectional view of the drip pan taken along lines 2—2 of FIG. I showing the joint formed of the drip panels.

Referring now to the accompanying drawings, FIG. 1 is a partial plan view of the center wing/fuselage section of a high wing aircraft showing the placement of the novel fiberglass honeycomb drip pan, beneath the center wing fuel tank, which forms part of the secondary fuel enclosure of the present invention.

As shown in FIG. 1, appropriate placement of the lower drip pan within an aircraft is made beneath the fuel tank carried by the aircraft in the center wing section of fuselage 1 supporting wings 2. For simplicity of illustration, approximately one-half of the lower drip pan is shown in FIG. 1 as it may be made substantially symmetrical about a longitudinal center line. As shown in FIG. 1, the lower drip pan 10 of the enclosure desirably comprises a pair of substantially flat panels 11 and 12 joined by a set of connecting flanges 13 and 14 to form a V-shaped assembly defining a shallow trough. Panels 11 and 12 of which the lower drip panel 10 is comprised may be of any suitable high strength, lightweight and corrosion resistant material, although for the representative embodiment herein described, fiberglass honeycomb panels having a nomex core were found suitable as exhibiting desirable lightweight, stiffness, corrosion resistance, and thermal and acoustic insulative properties.

FIG. 2, which is a partial view of FIG. 1 taken along lines 2—2 shows the dihedral intersection of panels 11 and 12 and the shallow trough formed thereby. The trough at the joint between panels 11 and 12 provides a means for collecting liquids seeping from the center wing tank and conducting those liquids away for discharge overboard. To this end, a drain hole 15 may be provided in the trough at a lateral extremity of drip pan 10 to provide the means to drain liquid accumulation.

Referring now to FIG. 3, which is a schematic sectional view of FIG. 1 taken along lines 3—3, an overboard drain line 16, connected to drain hole 15 may be provided to discharge liquid accumulations overboard. Trap 17 may be provided in drain line 16 to provide means to observe and identify discharged liquids.

Figure 4:
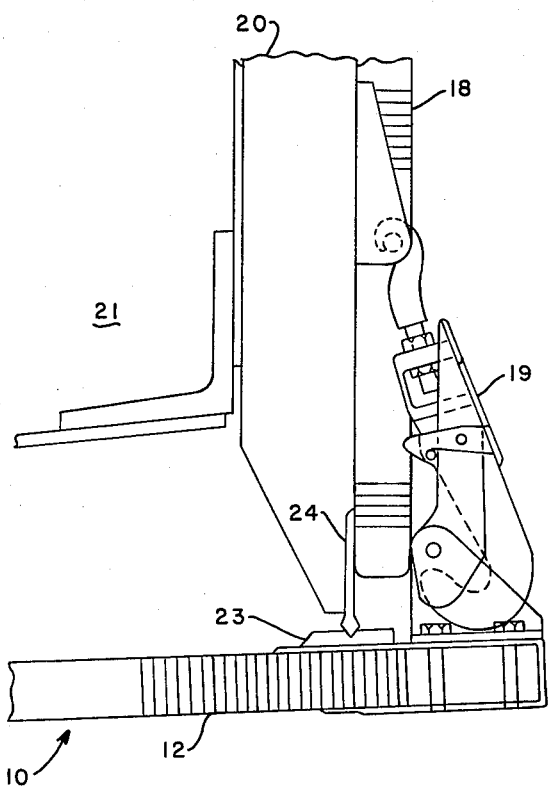
FIG. 4 is a view of FIG. 1 taken along lines 4—4 showing the attachment of the end panels to the lower drip panel of the enclosure.

The fiberglass honeycomb drip pan 10 may be conveniently secured beneath the wing box to vapor-tight bulkheads at the wing rear spar aft of the fuel tank and at the fuselage frame just forwardly of the fuel tank. Individual fiberglass honeycomb panels comprising the front and rear bulkheads of the enclosure are removably attached to provide access to the enclosed tank to facilitate inspection and maintenance. Referring now to FIG. 4, which is a view taken along line 4—4 of FIG. 1, the aft bulkhead of the fuel tank enclosure therefore comprises an upright fiberglass honeycomb panel 18 to which lower drip pan 10 may be secured by a plurality of overcenter latches 19. Panel 18 at the aft end of the enclosure may be in turn secured to an outstanding flange 20 of the rear wing spar aft of fuel tank 21. Likewise, the forward bulkhead of the enclosure may comprise panels attached to posts between the forward edge of drip panel 10 and the fuselage frame structure. Panel 11 may be secured thereto using overcenter latches 19', positioned as shown in FIG. 1, in a manner substantially the same as latches 19.

Referring now to FIG. 5, which is a view of the drip panel assembly 10 taken along line 5—5 of FIG. 1, the lateral edges of drip panel 10 may be supported by the frame of fuselage 1 through a plurality of overcenter latches 22.

Drip pan 10 is provided near its periphery with a molded sponge rubber resilient seal 23 to provide the desired liquid/vapor seal for the secondary enclosure of the present invention. Sealing of the peripheral edges of drip pan 10 is provided by the engagement of a seal depressor 24 attached to the upright panels forming the fore and aft bulkheads of the secondary enclosure substantially as shown in FIG. 4, which depicts the sealing configuration for panel 18 against panel 12. As shown therein, depressor 24 is attached to upright panel 18 and seals to peripheral seal 23 upon engagement of overcenter latches 19. Sealing of the lateral edges of drip pan 10 may be provided substantially as shown in FIG. 5, wherein peripheral seal 23 engages a depressor 25, which is secured to the frame of fuselage 1, upon engagement of overcenter latches 22.

It was determined that desirable support and sealing of drip pan 10 was effected using overcenter latches 19, 19' and 22 spaced approximately twenty-four inches around the periphery of drip pan 10.

Figure 6:
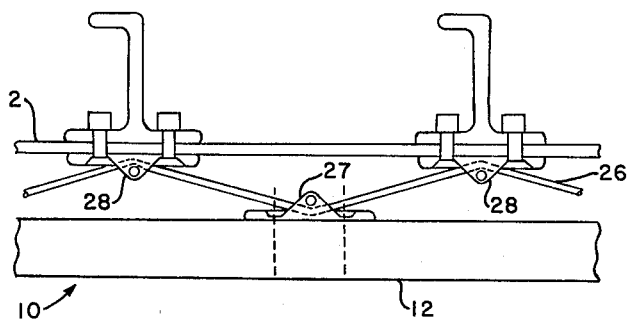
FIG. 6 is a view of FIG. 1 taken along lines 6—6 illustrating the inboard lacings for supporting the drip pan.

Inboard of the periphery latches 22, the drip pan 10 may be provided with additional support through the use of a plurality of Kevlar® lacings 26. The lacings are threaded through eyelet brackets 27 on the upper surface of drip pan 10, and eyelet brackets 28 secured to the lower surface of the center wing box of wing 2, substantially as shown in FIG. 5. FIG. 6, which is a view taken along lines 6—6 of FIG. 1 illustrates the configuration of lacings 26 for the inboard portion of drip pan 10. Although other lacings may provide suitable support as contemplated herein, ⅛ inch diameter Kevlar® was selected as having desirable strength and cold flow/stretch resistance.

Suitable means (not shown) such as a fan, blower or the like, may be used to provide a constant flow of aircraft cabin air through the space between the enclosure and the center wing tank to continuously flush fuel vapor overboard through drain line 16 (see FIGS. 1 and 3). Drain line 16 may be conveniently sized to accomodate a desirable level of air flow.

The present invention, as hereinabove described, therefore, provides an improved secondary aircraft fuel tank enclosure which provides desirable protection of occupied aircraft compartments from fuel/vapor leakage, and may be removed for maintenance and inspection of the enclosed aircraft structure. It is understood that certain modifications to the invention as hereinabove discribed may be made, as might occur to one with skill in the field of this invention, within the scope of the appended claims. Therefore, all embodiments contemplated hereunder have not been shown in complete detail. Other embodiments may be developed without departing from the spirit of this invention or from the scope of the appended claims.

We claim:

1. A removable enclosure for sealing an aircraft fuel tank against fuel leakage into aircraft fuselage compartments, comprising:
   a. a drip pan disposed beneath said tank within said fuselage, said pan defining a shallow trough for collecting liquid from said tank;
   b. a peripheral seal on the surface of said pan;
   c. means defining a drain line, communicating with said trough, for draining said liquid accumulations overboard said aircraft;
   d. first and second upright panels, attached to said aircraft, at respective opposite ends of said pan; and
   e. means for releasably sealing said ends of said pan to said upright panels and the sides of said pan to said fuselage at said peripheral seal, said means including a plurality of overcenter fasteners spaced around the periphery of said pan releasably interconnecting said pan with said aircraft and said upright panels.

2. The enclosure as megited in claim 1, wherein said shallow trough is formed by a pair of substantially flat panels joined dihedrally.

3. The enclosure as recited in claim 2, wherein said flat panels and said upright panels comprise fiberglass honeycomb panels.

* * * * *